United States Patent Office 3,335,541
Patented Aug. 15, 1967

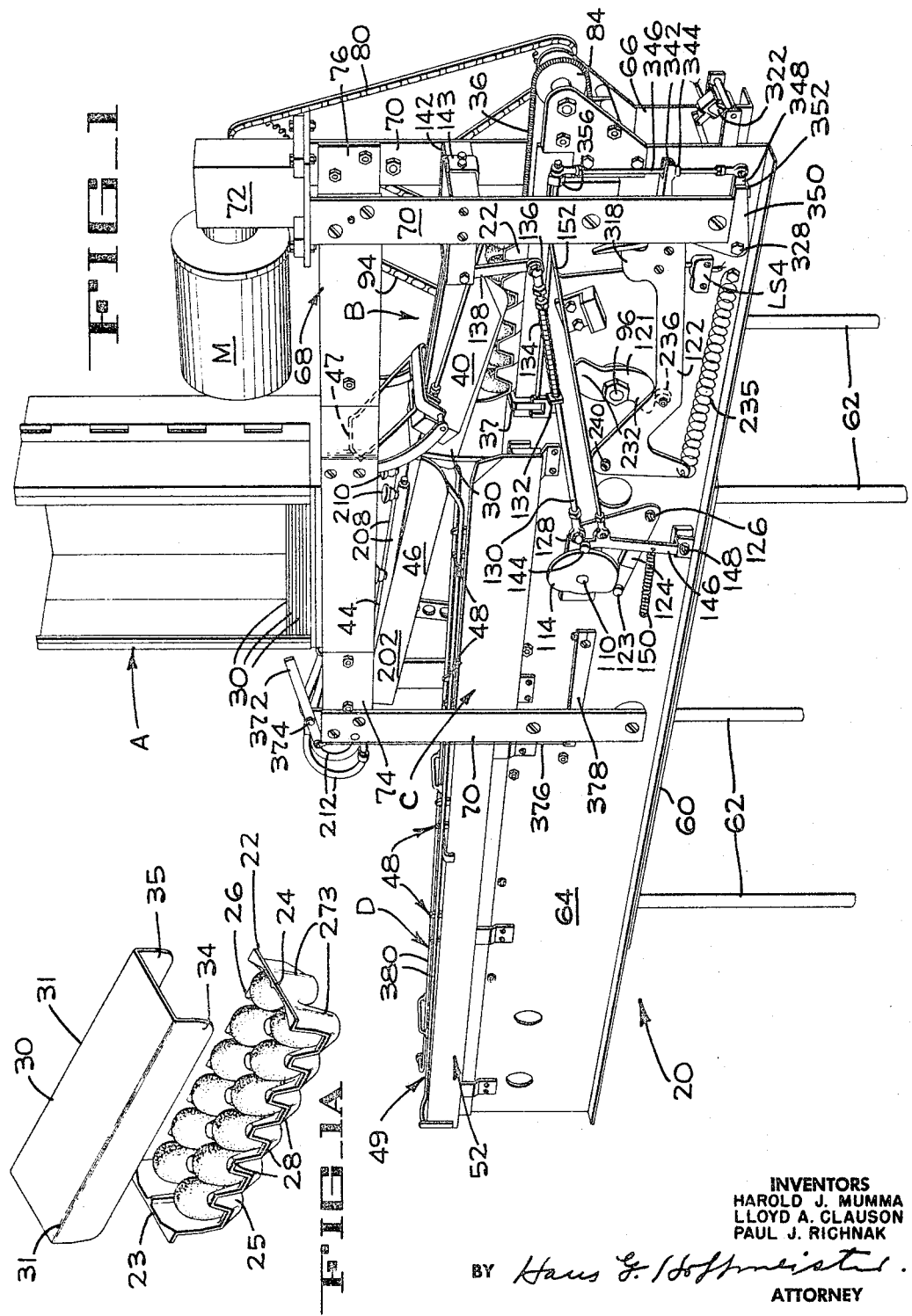

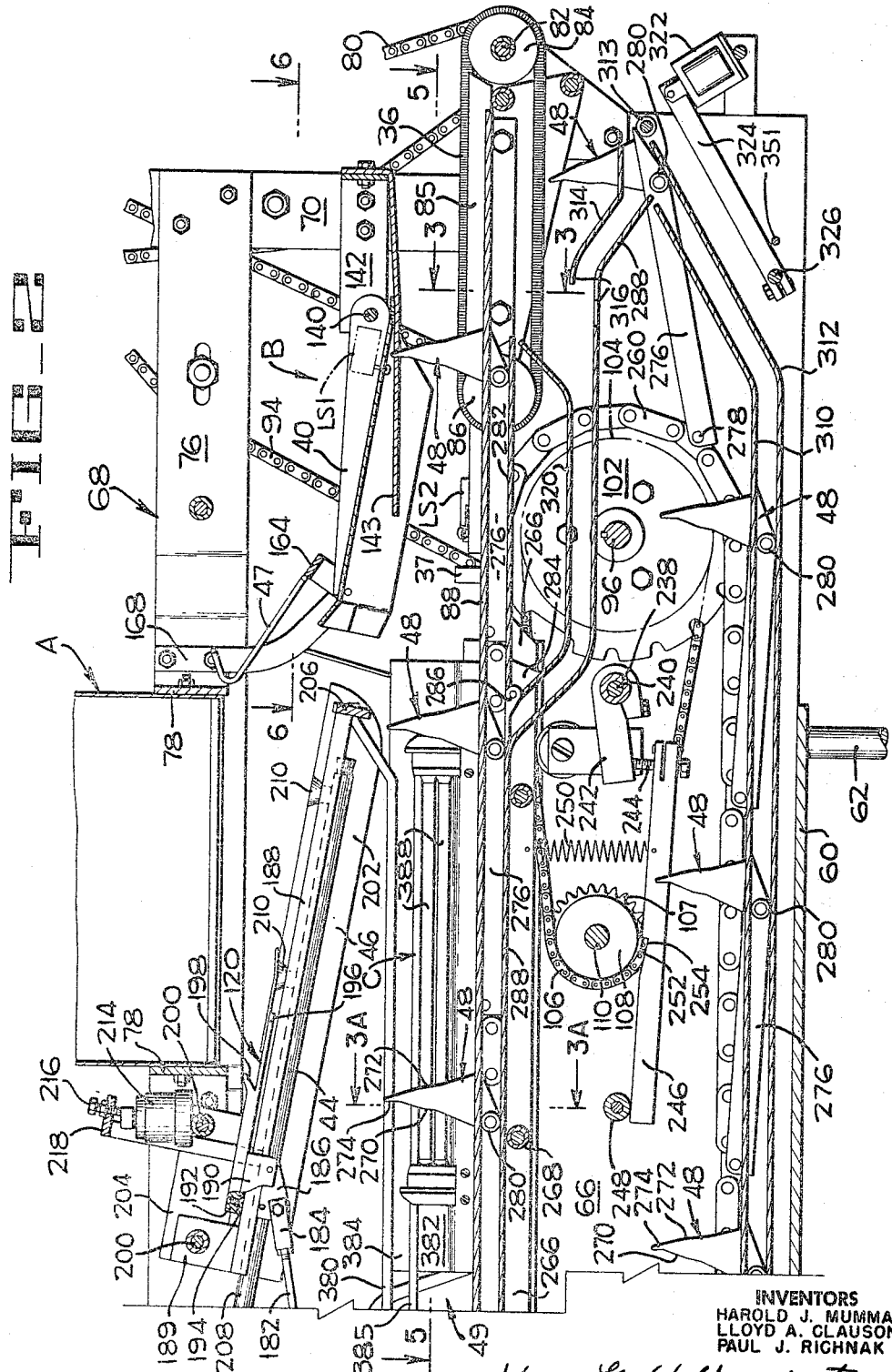

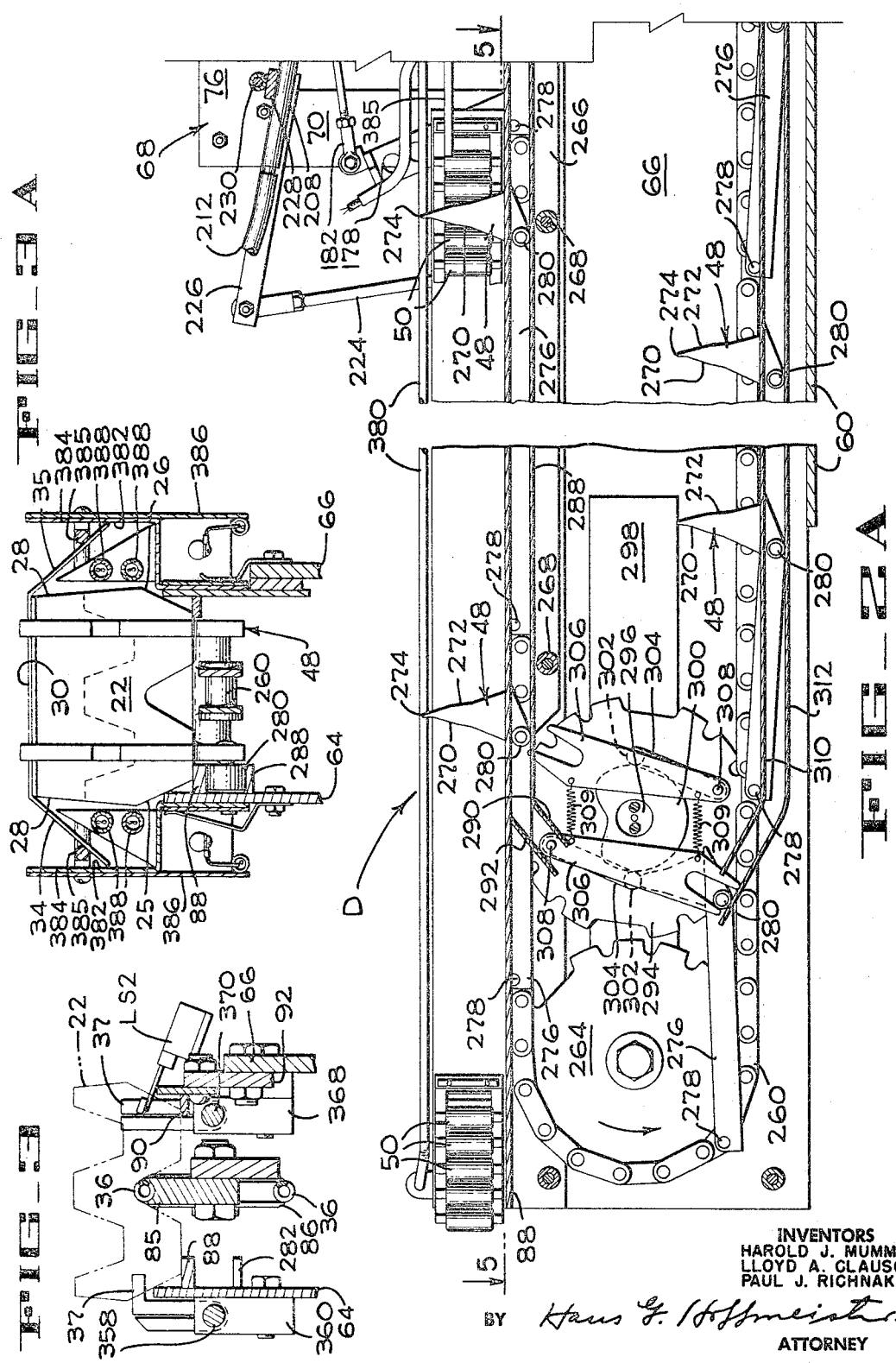

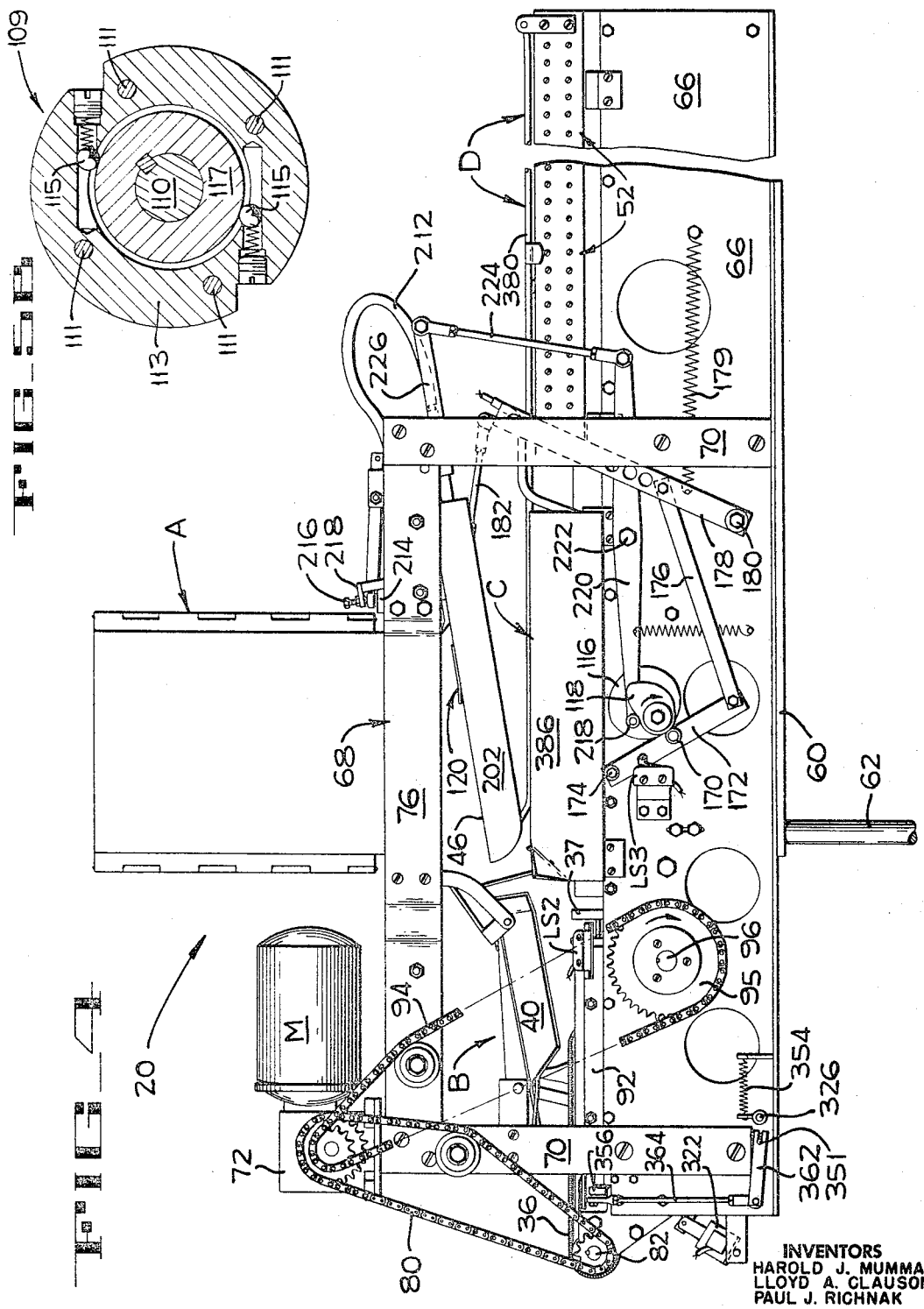

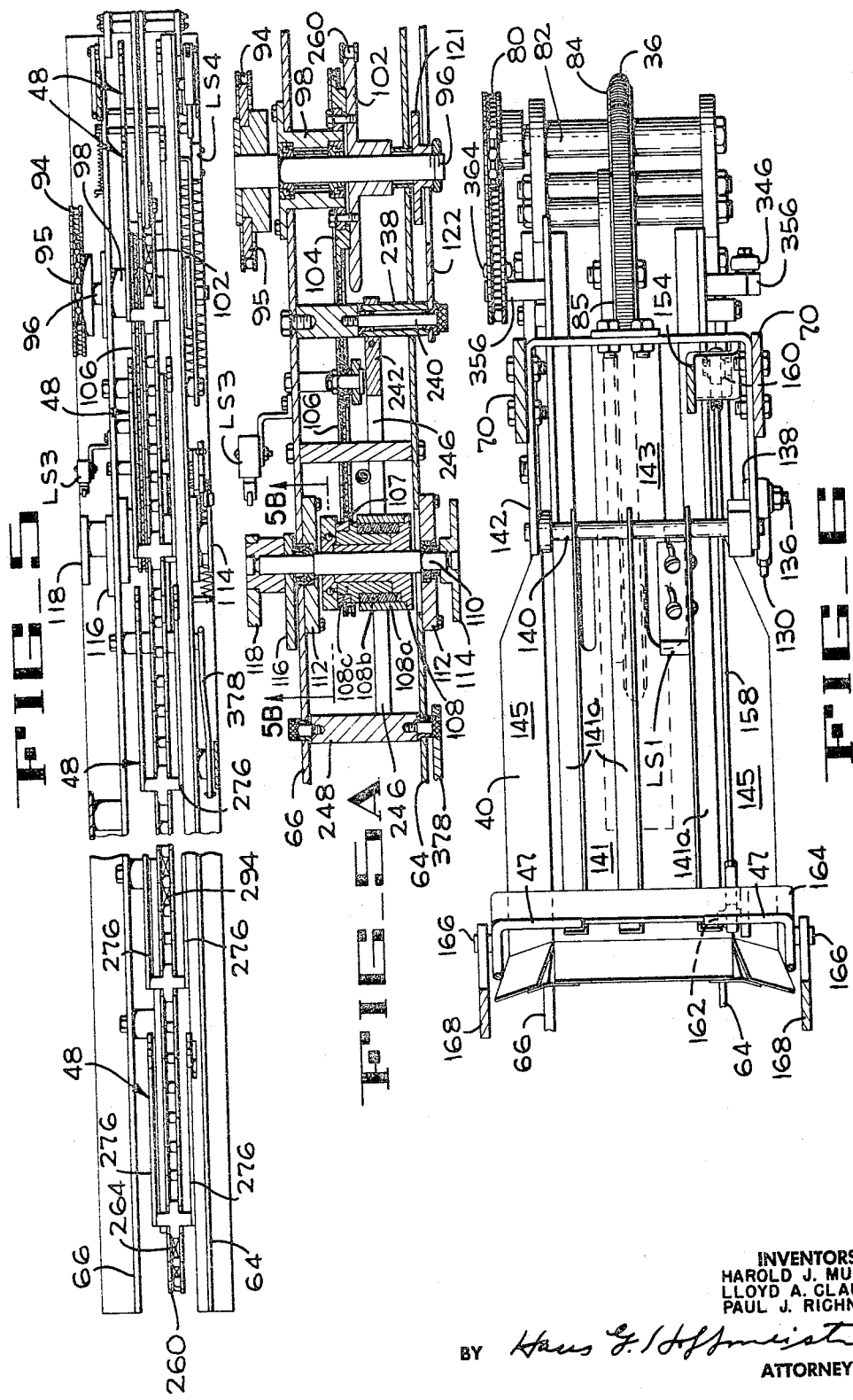

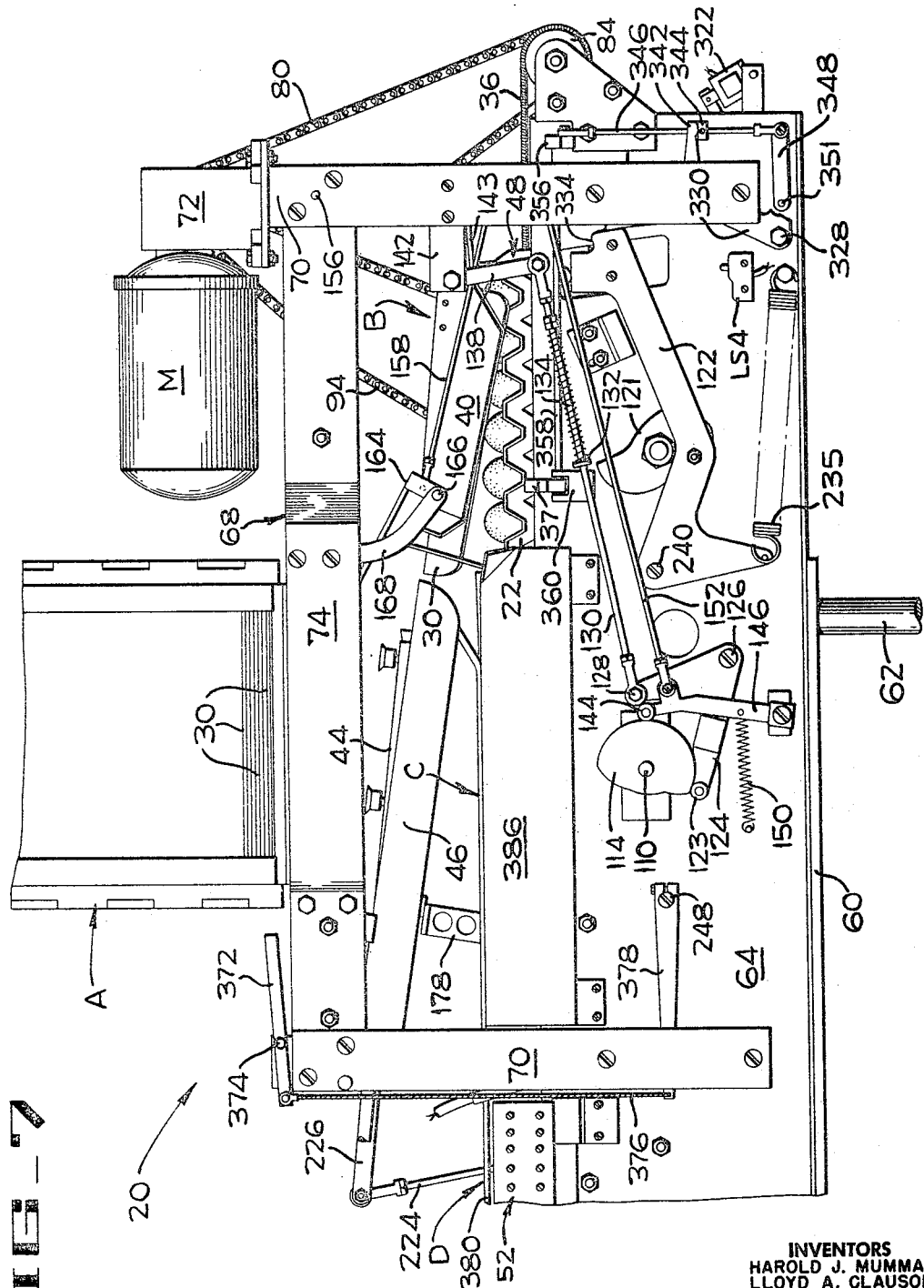

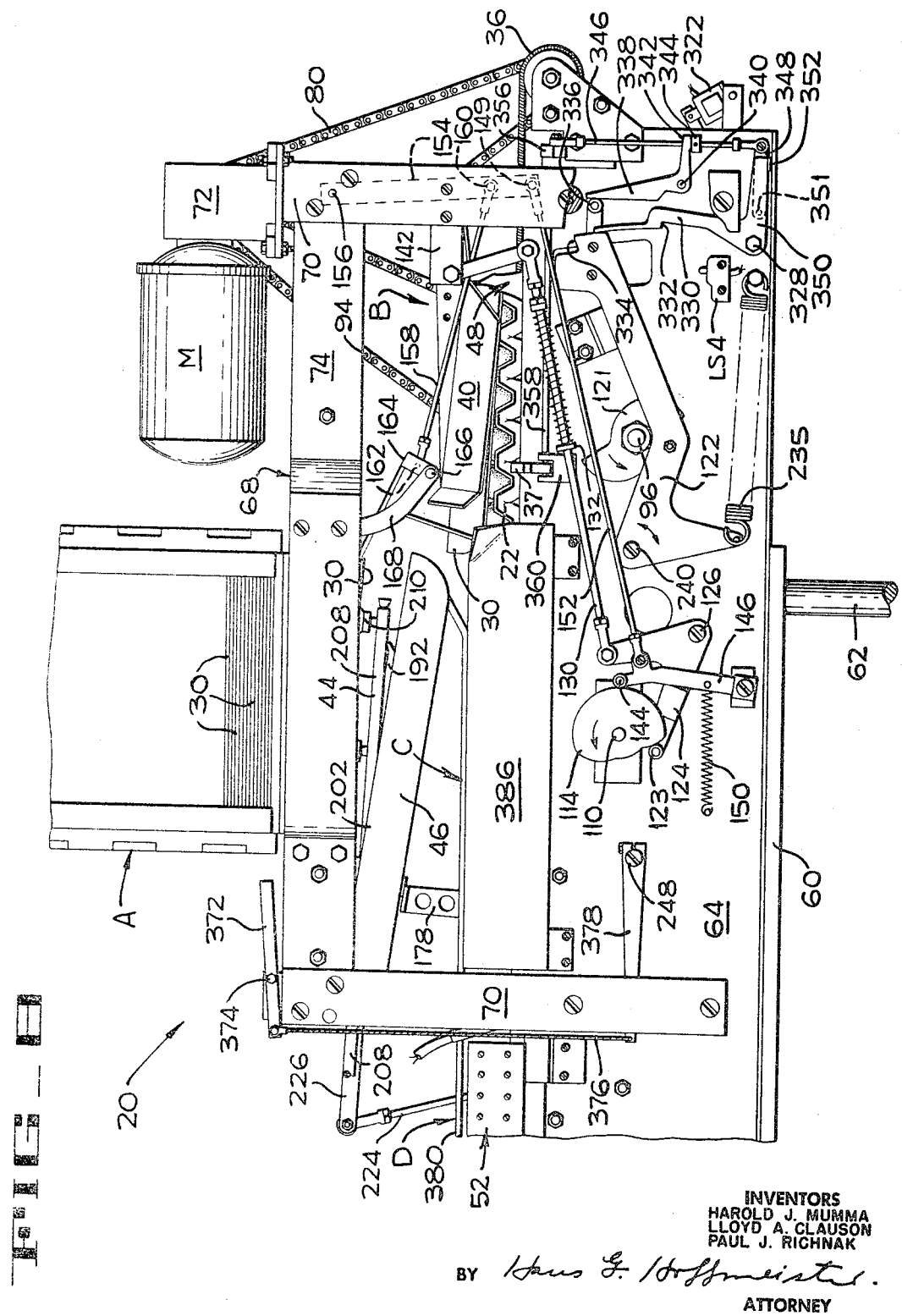

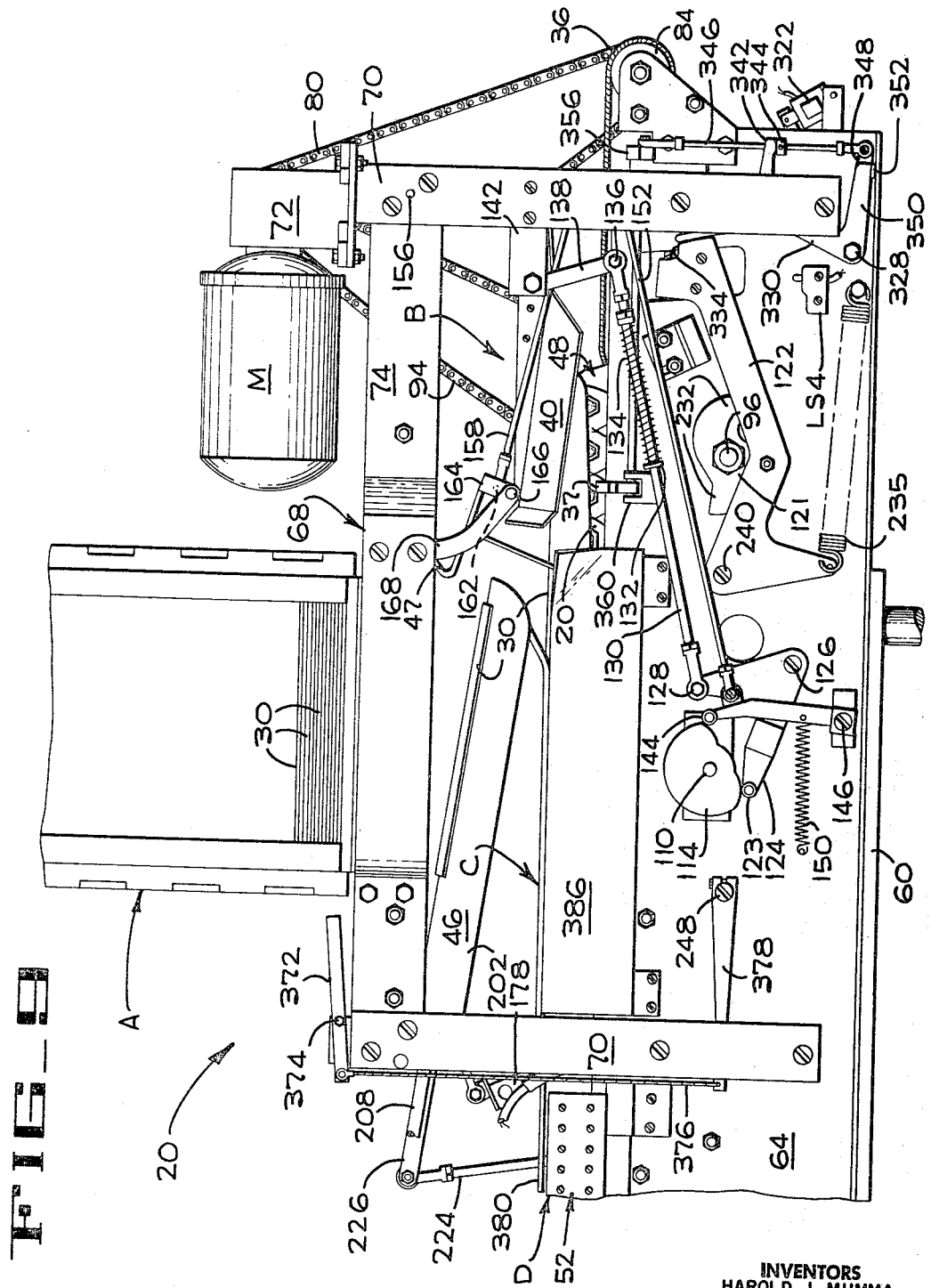

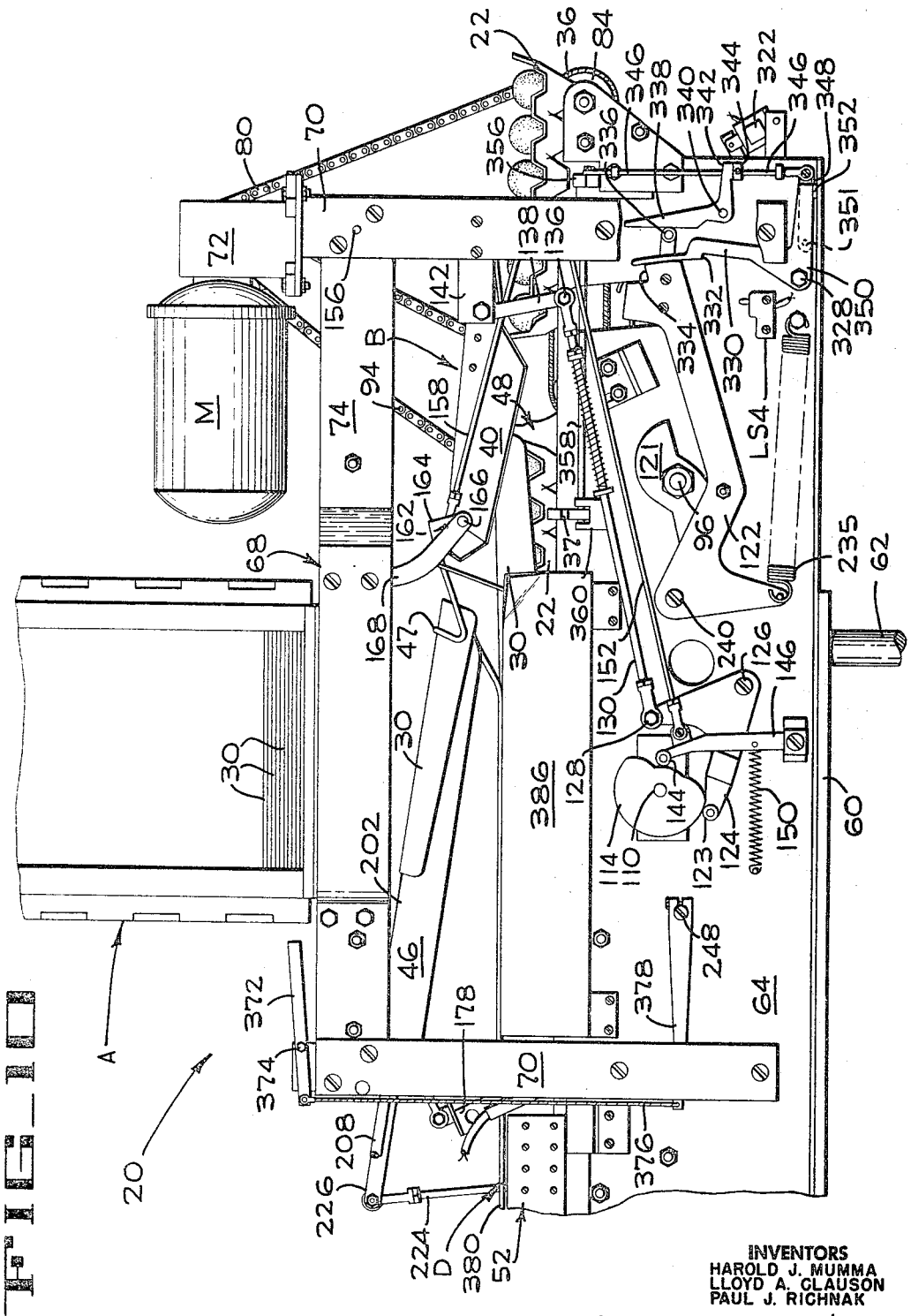

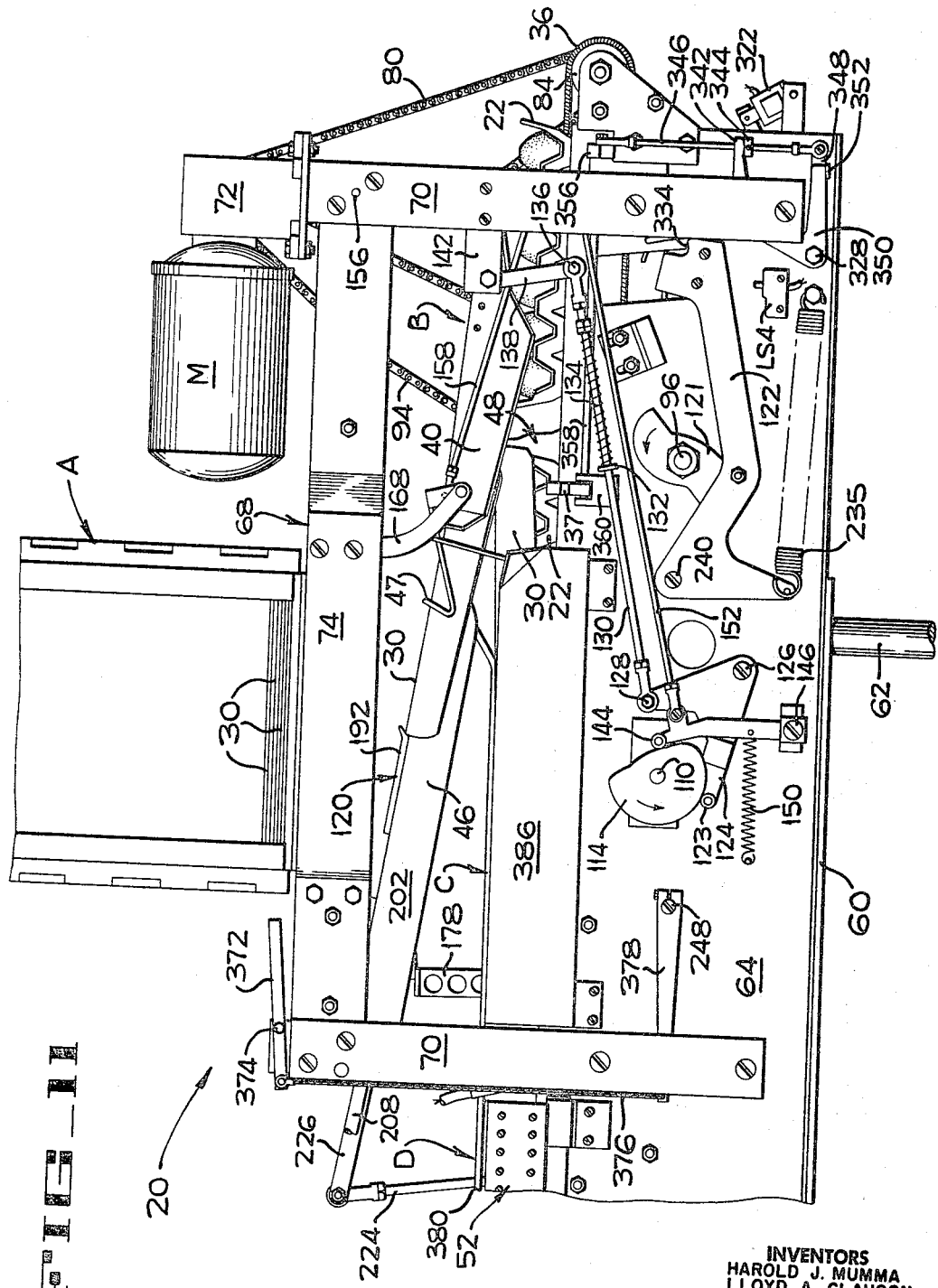

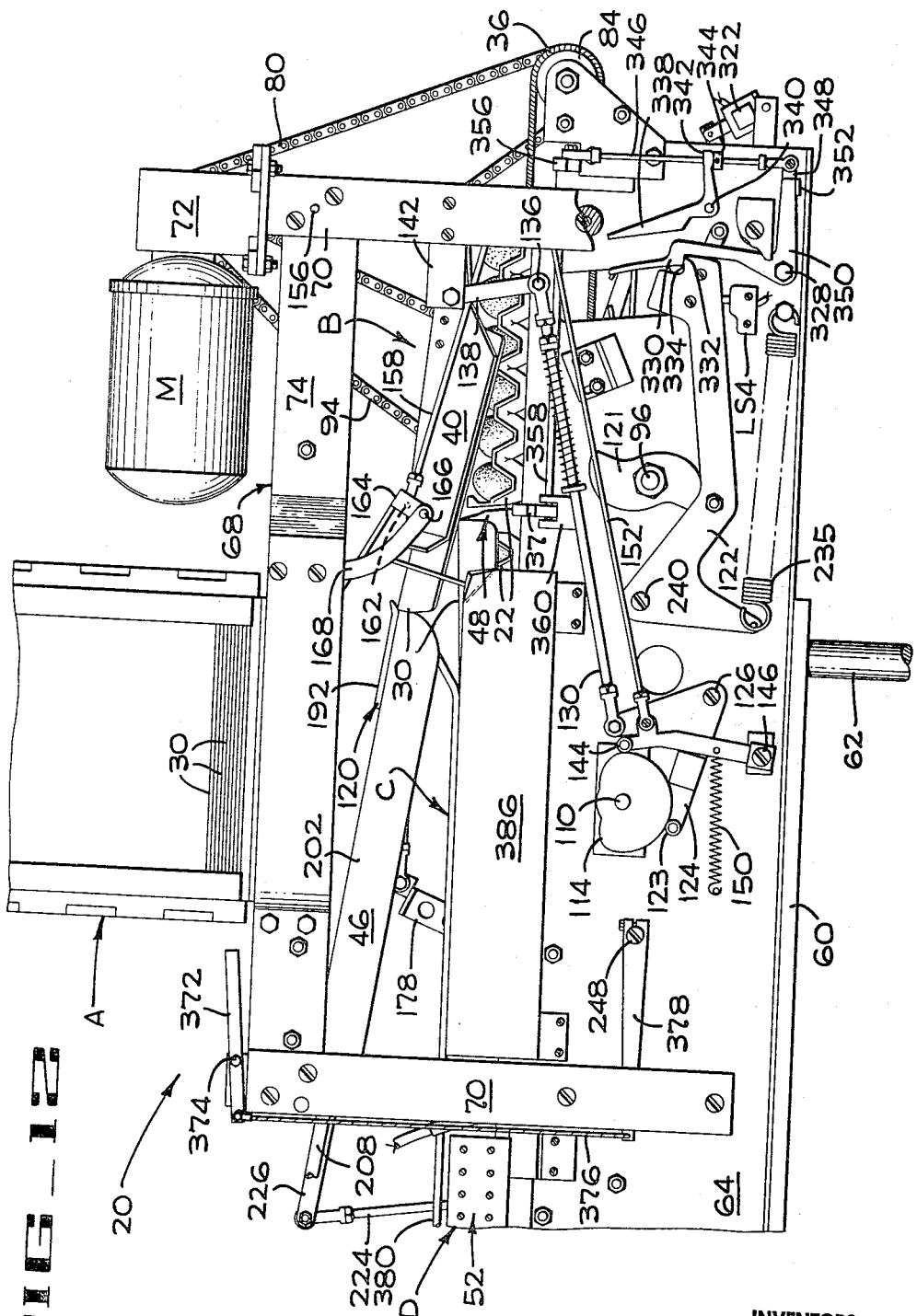

3,335,541
METHOD OF AND APPARATUS FOR HANDLING CARTONS
Harold J. Mumma, Riverside, and Lloyd A. Clauson and Paul J. Richnak, San Bernardino, Calif., assignors to FMC Corporation, San Jose, Calif., a corporation of Delaware
Filed Mar. 30, 1965, Ser. No. 443,944
16 Claims. (Cl. 53—41)

The present invention pertains to methods of and machines for handling cartons, and more particularly relates to a method of placing a cover in sealed relation on a carton and an apparatus for carrying out the method.

An object of the present invention is to provide an improved machine for applying covers to cartons.

Another object is to provide a machine for automatically folding paperboard cover blanks, and applying and sealing individual folded covers to molded paper-pulp egg trays.

Another object of the invention is to provide a machine according to the preceding object wherein the operating cycles of the machine are controlled by the covers and trays so that an absence of either a cover or tray interrupts the cycle.

Another object is to provide a continuously operating tray conveyor having pusher flights automatically engageable with the trays only after associated components are in predetermined operating condition.

Another object is to provide a machine for folding, applying and sealing covers on containers wherein the timing of the separate operations overlap in order to reduce the over-all time required for each container covering operation.

A further object is to provide a machine for applying covers to egg trays while the trays are moving along a conveyor.

Another object is the provision of an improved conveyor for handling articles such as cartons.

A further object is the provision of a machine for placing covers on moving trays wherein one cover is fed into tray covering position while a subposed tray and cover from the previous operation underlie said one cover.

Another object is to provide an improved cover folding mechanism.

Another object is to provide an efficient method of applying and sealing covers on containers.

Other objects and advantages of the present invention will become apparent from the following description, and the accompanying drawings, wherein:

FIGURE 1 is a diagrammatic perspective of the carton handling machine of the present invention viewed from its upstream or inlet end.

FIGURE 1A is a diagrammatic perspective of one of the cartons or egg trays and its cover.

FIGURE 2 is a vertical longitudinal section, partly broken away, of the inlet end portion of the machine shown in FIGURE 1, the major portion of the section being taken along a plane just inside of the near side plate of the machine.

FIGURE 2A is a longitudinal section forming a continuation of FIGURE 2, partly broken away and illustrating the discharge end of the machine, the section being taken substantially along the same section plane as that of FIGURE 2.

FIGURE 3 is a vertical section taken along line 3—3 on FIGURE 2.

FIGURE 3A is a vertical section taken along lines 3A—3A on FIGURE 2.

FIGURE 4 is a fragmentary diagrammatic elevation of the side of the machine opposite to the side illustrated on FIGURE 1.

FIGURE 5 is a horizontal section taken generally along a general plane indicated by the lines 5—5 on FIGURES 2 and 2A, and is at a reduced scale.

FIGURE 5A is an enlarged section of the right end portion of FIGURE 5 but along a slightly different section plane.

FIGURE 5B is a section taken along lines 5B—5B on FIGURE 5A.

FIGURE 6 is an enlarged fragmentary section indicated generally by the lines 6—6 on FIGURE 2.

FIGURES 7-12 are fragmentary side elevations illustrating successive operational steps in folding, applying and sealing individual covers on filled egg trays.

The carton handling machine 20 (FIG. 1) operates in conjunction with a conveyor, not shown, that delivers a single file of either abutting or spaced apart, molded paperpulp egg trays 22 that are filled with eggs. The trays have leading and trailing end walls 23 and 24 (FIG. 1A) which are slightly higher than the eggs in the trays, and side walls 25 and 26. Each side wall is formed by spaced upstanding members that define deep notches and a generally serpentine edge portion on which a narrow band 28 of thermoplastic adhesive material is deposited. One adhesive which has proven satisfactory is marketed under the name Thermogrip by the United Shoe Machinery Corporation of Boston, Mass. The adhesive is deposited in a heated tacky condition on the serpentine edge of the trays 22 at the time of their manufacture, and it then becomes non-tacky at normal temperatures. When reheated, the adhesive will again become tacky so that it will grip a cover that is subsequently applied to the tray. The carton handling machine 20 functions to remove an initially-flat paperboard cover 30 from a magazine A, fold the side portions downwardly along score lines 31 into inverted U-shape, apply the folded cover to a tray 22 at a tray cover applying zone B so that the top panel of the cover rests upon the end walls 23 and 24 of the tray, and the cover side flaps 34 and 35 lie adjacent the tray walls 25 and 26. During and after the tray covering operation, the tray is continuously advancing through the machine. At a heating zone C, heat is directed against the side walls 25 and 26 to activate the adhesive band 28, following which the covered tray is conveyed along a pressure applying zone D at which the side flaps 34 and 35 are pressed against the activated adhesive. This pressure is maintained until the covered tray is discharged, at which time the adhesive band has cooled and set, and the cover is securely bonded to the tray.

More specifically, and with continued reference to FIGURES 1 and 1A, each incoming tray 22 is supported by means including a centrally located and continuously driven input belt 36 (FIG. 3), which delivers the tray to a rest position against a pair of stops 37, and support rails 88 and 90 which appear later in the description. The stops position the tray at the covering zone B, at which the tray underlies a pivotally mounted cover applying chute 40. In a preceding cover-applying sequence, similar to the sequence next considered, the lowermost cover 30 of a stack of unfolded covers in the magazine A was pulled downward and delivered in flat condition by a vacuum-type picking arm 44 onto a folding shoe 46. During this sequence, a folding arm 47 moved downward over the cover 30, folded it into inverted U-shape over the shoe 46, and a ram, later described, pushed the folded cover down the way formed by the shoe 46 toward the inlet end of the machine and into the correspondingly shaped, cover-applying chute 40.

The chute 40 then pivots downward and places the folded cover 30 on the underlying tray 22 as the stops 37 are lowered and the tray begins to move through the machine.

The tray is conveyed by one pair of a plurality of side-by-side pairs of intermittently driven, tray pushers 48 (FIGS. 1 and 3A) which rise into contact with the tray only when a cover is in the chute 40, and move the tray and covers along a conveying flight 49. The pushers 48 move the tray and cover downstream to the heating zone C. Immediately upon the entrance of the covered tray into the heating zone C, the next cover 30 in the magazine is removed, folded and delivered as described into the cover applying chute 40 in readiness for the next incoming tray 22. At the heating zone C, heat is applied to the outer surfaces of the side walls 25 and 26 to activate the adhesive bands 28 on the tray 22. This tray and cover then enter the pressure zone D which extends to the discharge end of the machine. Spring-urged pressure applying rollers 50 (FIG. 2A) are positioned throughout the length of the pressure zone D and push each side flap 34 and 35 against the initially plastic and tacky adhesive bands 28 on the side walls 25 and 26 of the tray 22. As the adhesive chills while the pushers 48 advance the covered tray through the pressure zone D, the adhesive sets and the cover and tray are securely bonded together.

*Frame and drive structure*

The carton handling machine 20 (FIGS. 1–4) is mounted upon a table 60 supported by legs 62 and, as previously indicated, the machine is positioned at the discharge end of a conveyor filling machine which delivers a single file of the filled egg trays 22 into the machine for covering. As viewed looking in the direction of movement of the trays through the machine, the main body of the machine includes left and right elongate side plates 64 and 66, respectively, (FIGS. 3, 3A) and an elevated platform 68 (FIG. 1) which is mounted on legs 70 that are secured to the side plates 64 and 66. The platform 68 supports the magazine A, a drive motor M, a gear box 72 that is driven by the motor M, and other parts as will appear later in this description. The platform 68 includes left and right side bars 74 and 76, respectively, between which cross bars 78 (FIG. 2) extend. The magazine A is supported by the bars 78 in the usual manner so that its bottom end is unobstructed.

A chain and sprocket drive train 80 (FIG. 4) couples the output shaft of the gear box 72 to a rotatable driveshaft 82 which is at the inlet end of the machine and on which a drive pulley 84 (FIG. 2) for the input belt 36 is secured. The input belt 36 is continuously driven by the motor M during operation of the machine and is formed by an endless tension spring trained around the drive pulley 84, over a guide bar 85, and around an idler pulley 86. Means for supporting the trays 22, in addition to the input belt 36 comprises the upper surface of the rail 88 (FIG. 3) which extends the length of the machine and is secured to the inner surface of the left side plate 64. The rail 90 is similarly secured to the right side plate 66 by means of a spacer bracket 92.

A second chain and sprocket drive train 94 (FIGS. 2 and 4) is coupled to the output shaft of the gear box 72 and to a driveshaft 96 which extends through both side plates 64 and 66 and is supported by a bearing 98 (FIG. 5A) that is secured to the inside of the right side plate 66. The drive train 94 includes a sprocket 95 which is mounted on the shaft 96 for angular adjustment relative to the shaft to facilitate timing adjustments. Mounted on the shaft 96 in centered relation to the upper conveying flight 49 (FIG. 1) is a conveyor drive sprocket 102 (FIG. 2), later referred to. Adjustably mounted on the sprocket 102 is a clutch drive sprocket 104 (FIG. 5A) which supplies power by means of a chain 106 to the driving sprocket 107 of a pawl-controlled uni-directional clutch 108. Clutch 108, in a manner later described, is arranged to intermittently rotate a shaft 110 upon which the clutch is mounted. The clutch 108 is of the well-known type including an outer sleeve 108a which is setscrewed to shaft 110 and which, when stopped from rotation by a pawl, winds up an inner coil spring 108b that encircles a drive hub 108c keyed to sprocket 107 and a driven hub that is operatively connected to the sleeve 108a. The spring is thus reduced in diameter to provide positive drive between the hub members. When the outer sleeve is not held by the pawl, the spring assumes a larger diameter and cannot transmit driving force. The clutch may be of the type listed as D 43–7 which is manufactured by the Curtiss-Wright Corporation of Cleveland, Ohio. Associated with the clutch 108 is a speed control clutch 109 (FIG. 5B) which governs the speed of the shaft 110. Bearings 112 (FIG. 5A) mount the shaft 110 in the side plates 64 and 66, and the shaft projects through both side plates and carries three face cams 114, 116 and 118.

When the shaft 110 is driven by the clutch 108, various later described spring-urged cam follower rollers that are engaged with the face cams 114, 116 and 118 tend to impart rotational force to the shaft 110 in excess of the speed at which it is driven. To prevent such force from affecting the speed of the shaft 110, the driving sprocket 107 is secured by bolts 111 (FIG. 5B) to an outer ring 113 of the speed control clutch 109. The ring carries spring-urged balls 115 which bear against a collar 117 that is keyed to the shaft 110. The balls are arranged so as to prevent counterclockwise rotation of the shaft 110 at a speed greater than the speed of the driving sprocket 107, but to permit free rotation of the sprocket 107 when the shaft 110 is at rest.

The control cam 114 (FIG. 1) is secured to shaft 110 adjacent the side plate 64 to govern the raising and lowering of both the folding arm 47 and the cover applying chute 40.

The cover delivery cam 116 (FIG. 4) and the cover feed cam 118, respectively referred to hereinafter as the delivery and feed cams, are secured to the opposite end portion of the shaft 110. Feed cam 118 controls reciprocation of the picking arm 44 to remove and position unfolded tray covers 30 from the magazine 42 onto the folding shoe 46. The delivery cam 116 functions to advance and retract a ram mechanism 120 (FIG. 2) which feeds the folded cover from the folding shoe 46 into the cover applying chute 40.

A lift cam 121 (FIGS. 1 and 5A) is secured to the end portion of the driveshaft 96 adjacent the left side plate 64. The lift cam controls a lift arm 122 which governs the path of movement of the tray pushers 48 through the cover applying zone B according to whether or not a tray and cover are assembled in position ready for ejection therefrom. If a tray and cover are ready for ejection from the cover applying zone B, a pair of pushers 48 is elevated by the lift arm 122 into pushing relation to the tray and cover. If not, the lift arm remains down and the pushers 48 move along a lower path and bypass zone B.

*Control linkage and control elements*

The control cam 114 (FIG. 1) is engaged by a cam follower roller 123 that is carried by a bell crank 124.

The bell crank is pivoted at 126 to the side plate 64, and is pivoted at 128 to a rod 130 which extends through an apertured block 132 that is secured to the side plate 64. A compression spring 134 is mounted on the rod 130 between the block 132 and a stop nut on the rod near its upper end to resiliently urge the cam follower roller 123 against the edge of the control cam 114. A pivot bolt 136 connects the upper end of the rod 130 to an arm 138 which depends from a transverse pivot shaft 140 (FIGS. 2 and 6). The pivot shaft 140 is rotatably mounted in the arms of a U-shaped bracket 142 which is bolted to the upstream pair of the legs 70, and the cover applying chute 40 (FIG. 6) is mounted on the pivot shaft 140. The chute 40 comprises a sheet metal upper panel 141 having reinforcement ribs 141a and side walls 145 that diverge slightly in a downward direction. The entrance throat of the chute flares outward to facilitate the entry of a folded cover 30, and the ribs 141a are apertured to receive the pivot shaft 140. A fixed cover guide bar 143 (FIGS. 1 and 2) is bolted to the bracket 142 and extends downstream therefrom through the chute 40 at an elevation just above the incoming trays 22. The guide bar 143 supports and guides the leading portions of folded covers delivered into the chute 40 by the ram mechanism 120, and is straddled by the tray pushers 48.

Also engaged with the control cam 114 (FIG. 1) is a cam follower 144 of a lever 146 that is pivoted at 148, and is urged toward the control cam 114 by a tension spring 150. A control rod 152 is pivoted at its lower end to the lever 146, and is pivoted near its upper end at 149 (FIG. 8) to a lever 154 which depends from a pivot bolt 156 that is threaded into one of the legs 70. A control rod 158 (FIGS 6 and 8) is pivoted to the lever 154 at 160, and at 162 to an inverted U-shaped bracket 164 which carries the folding arm 47. The folding arm 47 is most clearly shown in FIGURE 1. The bracket 164 is mounted on pivot studs 166 and associated fixed legs 168 that depend from the side plates 74 and 76 of the elevated platform 68.

It will be seen that rotation of the control cam 114, counterclockwise as viewed in FIGURE 1, and the consequent swinging movement of the depending lever 154 will cause the folding arm 47 to swing downward from its elevated position shown in FIGURE 7. Following the down and up movement of the folding arm 47, the control cam 114 swings the bell crank 124 about its pivot at 126 whereby the cover applying chute 40 pivots downward from its uppermost FIGURE 1 position.

Returning now to the delivery cam 116 (FIG. 4), a cam follower roller 170 of a lever 172 is engaged with the cam 116 and thus causes the pivot lever 172 to swing about the axis of a pivot bolt 174. The pivot lever 172 is connected by a link 176 to a generally upright drive arm 178 which has its lower end portion pivoted at 180 to the side plate 66 and is spring urged in one direction by a tension spring 179. The upper end of the drive arm 178 is pivotally connected to a rod 182. A yoke and pivot pin 184 (FIG. 2) on the upper end of the rod 182 is connected to a generally triangular shaped plate 186, the upper edge of which slidingly engages the lower surface of a ram guide bar 188 that is laterally centered over the conveying flight 49.

Each of the side surfaces of the guide bar 188 is slidingly engaged by a block 190, only one block being shown, which is secured to the plate 186 and to a cover engaging pusher head 192. A friction-inhibiting nylon rubbing block 194 underlines the head 182 and slides on the upper surface of the guide bar 188. The free end of the head 192 is provided with an elongate finger 196 which lies beneath the open lower end of the cover magazine A when the head is in retracted position, and with an upstanding finger 198 which is arranged to hook the trailing edge of the tray cover when the head is propelled downwardly along the guide bar 188 by the delivery cam 116.

The guide bar 188 has an upstanding tab portion 189 secured to one of a pair of transverse bolts 200 and is positioned between two elongate side walls 202 (FIG. 2) of the folding shoe 46. Each folding shoe wall is provided at its upper end with an upstanding plate 204, only one being shown which is mounted on both bolts 200 and hence immobilizes the folding shoe wall in its illustrated position declining toward and in alignment with the cover applying chute 40. A cross bar 206 interconnects the lower end portions of the folding shoe walls and is connected to the guide bar 188. At the upper end, the guide bar 188 is held in spaced relation to the walls 202 and 203 by spacer sleeves. The guide bar 188 and the adjacent folding shoe walls 202 thus form a fixed, inclined unit.

A vacuum conduit 208 (FIGS. 1 and 2) is mounted for pivotal movement to a postion between the guide bar 188 and wall 202. Both conduits move in unison and are part of the picking arm 44 that is arranged to sequentially remove flat blanks from the magazine A and draw them down onto the folding shoe 46. The cover blanks are gripped by vacuum cups 210 that are mounted on the conduits 208 and are evacuated by a conventional vacuum pump, not shown. The pump is connected to the vacuum conduits 208 by means including flexible lines 212 (FIGS. 1, 2A and 4) through a flow valve 214. The valve 214 is spring-urged to a normally open position, and is closed by an associated bolt 216 when the conduits 208 are in their FIGURE 2 down position. The bolt 216 is threaded into a bracket 218 which is carried by the vacuum conduits 208. Because the bolt 216 closes the valve 214 when the vacuum conduits are in the FIGURE 2 position, the unfolded cover which has been delivered onto the folding shoe 46 is released by the vacuum cups 210.

Means for vertically oscillating the picking arm 44 (FIG. 2) is provided by the feed cam 118 (FIG. 4) which is engaged by a cam follower roller 218 of a rocking lever 220 which is pivoted at about mid-length by a bolt 222 projecting from the side plate 66. A link 224, which is pivoted to the other end of the rocking lever 220, is connected to an extension bar 226. Bar 226 is secured to a transverse bar 228 (FIG. 2A) that is pivotally mounted on a shaft 230 extending between the side plates 74 and 76. The vacuum conduits 208 are fastened to the bar 228, and hence rotation of the feed cam 118 (FIG. 4) rocks the vacuum conduits 208 between their uppermost positions in which the vacuum cups 210 (FIG. 2) engage the lower cover blank in the magazine A, and their lowermost positions in which the cover blank lies on the upper edges of the folding shoe walls 202.

The lift cam 121 (FIG. 1) rotates continuously with the driveshaft 96 to which it is attached, and is symmetrically formed with opposed camming portions 232. The lift arm 122 is urged counterclockwise about pivot 240 by a tension spring 235, and has a cam follower roller 236 engaged with the edge of the lift arm cam 121. The lift arm 122 is urged counterclockwise about pivot 240 by a tension spring 235, and has a cam follower roller 236 engaged with the edge of the lift arm cam 121. The lift arm 122 is secured to a sleeve 238 (FIG. 5A) by a bolt 240 upon which the sleeve is rotatable. The inner end portion of the sleeve 238 is clamped in the split end portion of a pawl actuator 242 (FIGS. 2 and 5A) which overlies a bolt 244 that is threaded through a pawl 246. Pawl 246 is pivotally mounted on a shaft 248 and is urged upward by a tension spring 250 towards the clutch 108, while the clutch carries a dog 252 which engages the wall of a notch 254 in the pawl 246. Because the lift cam 121 is provided with the two camming portions 232, the clutch is actuated twice during each revolution of the driveshaft 96.

Tray and cover conveyor

The pushers of each pair of tray pushers 48 (FIGS. 2, 2A and 5) are on opposite sides of an endless conveyor chain 260 which is trained around the drive sprocket 102 that is mounted on the driveshaft 96, and is trained around an idler sprocket 264 at the discharge end of the machine. The upper flight of the chain is supported by a wear strip 266 which is supported by transverse spacers and shafts 268.

Each pusher 48 has an upstanding portion with symmetrical front and rear edges 270 and 272 that are shaped to conform to portions 273 (FIG. 1A) of the leading and trailing end walls 23 and 24 of the trays 22. The spacing of the pushers along the chain 260 is such that one tray 22 fits snugly between adjacent pairs of pushers. At its uppermost end, each pusher has a forwardly inclined hook 274 that projects above the folded cover 30 on the tray 22 when the pusher is travelling along the upper run of the conveyor chain 260. Each pair of pushers is connected to the chain 260 by an elongate arm 276 which is secured to and trails the pushers in the lower run of the conveyor and leads the pushers in the upper run. Each arm 276 is fastened to a cross pin 278 that is rotatably mounted in a special attachment link of the chain. Near the juncture of the arm 276 and the upstanding edge 270 of each pusher which is adjacent the left side of the machine, is a laterally projecting cam follower roller 280.

Cooperating with and spaced below the tray support rail 88 (FIGS. 2 and 3) is a similar but shorter rail 282 which forms the lower member of a cam track for supporting the cam follower rollers 280 of the pushers at the cover applying zone B. The downstream end portion of the rail 282 is welded to a gusset 284 which pivotally mounts a cam track gate 286 which in FIGURE 2 is illustrated in its lowermost position. In such position, the upper surfaces of the gate and the strap 282 are coplanar with the upper surface of the linear portion of a cam track member 288 that has a declining end portion 290 (FIG. 2A). End portion 290 is cooperatively associated with a short track member 292 to lower the cam follower rollers 280. The upstanding tray engaging portions 270 and 272 of the pushers are thus lowered before the pushers decelerate when the cross pins 278 of the pushers travel beyond the top dead center of the idler sprocket 264. The succeeding covered tray thus assumes the pushing operation for the tray which has been released by a pusher.

The conveyor chain 260 is meshed with a transfer sprocket 294 that is rotatably mounted on a non-rotatable stub shaft 296 which extends inwardly from a plate 298 that is fixed in position inward of the side plate 66. Bolted to the end of the stub shaft 296 is a fixed face cam 300, the camming edge of which controls two cam follower rollers 302. Each roller 302 is mounted on an arm 304 that is in fixed, laterally offset relation to a bifurcated lever 306. A pivot pin 308 connects each lever 306 to the transfer sprocket 294, and the levers are interconnected by tension springs 309 to maintain the cam follower rollers 302 engaged with the fixed cam 300.

The timing arrangement of the transfer sprocket 294 relative to the conveyor chain 260 is such that the bifurcated end of one of the levers 306 is disposed in lateral alignment with the throat defined by the track member 292 and the end portion 290 of the cam track member 288, and in a vertical plane including an approaching one of the cam rollers 280. The roller is thus engaged by one of the levers 306, and the upstanding portions of the pushers 48 are lowered under positive control of the transfer sprocket 294 and associated members, whereby the cam roller is ultimately transferred into the adjacent inclined portion of a lower cam track comprising upper and lower track members 310 and 312.

The track members 310 and 312 (FIG. 2) near the inlet end of the machine slope upward and terminate at a point where their cam follower path intersects the cam follower path defined by the adjacent inclined end of the cam track member 288. Mounted near the intersection of the cam tracks on the left side plate 64 is a roller 313 which is arranged to provide pivotal support for the pushers 48, while they change direction of movement, so that their cam follower rollers 280 cannot re-enter the lower cam track. Track member 288, and an adjacent track piece 314 incline upward from the intersection to notched portions thereof at 316. The notches are laterally narrow so that the cam track will maintain support of the cam follower rollers 280 passing over those portions of the track, but will permit the vertical passage of an inwardly turned shelf 318 (FIG. 1) which is formed on the lift arm 122 and is movable in a slotted portion of the side plate 64. Under certain later described conditions, the lift arm 122 is permitted to be raised by the spring 235 from its FIGURE 1 position when a cam follower roller 280 is superposed above the shelf. The pair of pushers 48 associated with that cam follower roller are accordingly lifted until the roller is aligned with the upper cam track comprised of the rail 88 and track member 282 (FIG. 2), and the pusher lies behind or upstream of a covered tray.

In the event that a tray and/or a cover are not properly positioned at the cover applying station B, the pusher will not be lifted, but will follow a lower run of the cam track formed by a linear portion of the track member 288 and a similar track member 320. In this manner the cover applying zone B is bypassed by the pushers 48 until a covered tray is ready for movement downstream. The cam follower rollers 280 of the bypassing pushers 48 cause the gate 286 to be pivoted upward so that the rollers can enter the upper cam track run and move downstream of the gate along the upper conveying flight 49.

Electrical controls

Electrical controls of the machine include a normally open sensing switch LS1 (FIG. 6, and in phantom lines in FIGURE 2) that has an actuator lying within the cover applying chute 40 to detect the presence of a folded cover therein. A normally open switch LS2 (FIGS. 2 and 3) is mounted on the side wall 66 and has an actuator lying in the path of an incoming tray 22 upstream of the carton stops 37. A normally open electrical switch LS3 (FIG. 4) is mounted on the side plate 66 with its actuator lying in the plane of the feed cam 118. It will be noted that the ram mechanism 120 is aproaching mid-stroke in FIGURE 4, and that the feed cam 118 will close the switch LS3 after the ram has delivered a folded cover 30, not shown, into the cover delivery chute 40. A normally open switch LS4 (FIG. 1) is mounted on the side plate 64 in position for its actuator to be contacted when the lift arm 122 is in its lowermost position. The switches LS1, LS2, LS3 and LS4 are in series electrical connection with an electrical power source and a solenoid 322 (FIGS. 2, 4 and 7), and the solenoid is thereby energized when the switches are closed under the conditions set forth. The solenoid directly controls upward movement of the lift arm 122, and indirectly controls the carton stops 37, as will be presently described.

The solenoid 322 has its armature pivotally connected to a link 324 (FIG. 2) which at its other end is clamped to a cross shaft 326 that projects through the side plates 64 and 66. The left end of the shaft 326 is secured by a bolt 328 (FIG. 8) to a trigger 330. The trigger is provided with an abutment ledge 332 that is arranged to overlie a corresponding ledge 334 of the lift arm 122 when the lift arm is lowered and the solenoid 322 is deenergized. Thus, when the solenoid 322 is energized when the lift arm 122 is in its lowermost position, the trigger 330 pivots clockwise, releases the lift arm, and the spring 235 elevates the arm to its uppermost position shown in FIGURE 8. As previously mentioned, this action raises a pair of the pushers 48 into pushing relation with a tray 22 and its cover 30. Before this covered tray can be pushed downstream from the cover applying zone B, however, the tray stops 37 must be immediately lowered. For this purpose, the lift arm 122 (FIG. 8) carries a roller 336 which is arranged to pivot a bell crank 338 that is mounted on a pivot shaft 340 and has a bifurcated end 342 that overlies a collar 344. Collar 344 is secured to an upright rod 346. The lower end portion of the rod 346 is pivotally connected to an arm 348 (FIG. 7) which lies behind a lower leg 350 of the trigger 330 and is mounted on a pivot shaft 351. Leg 350 carries an inwardly projecting lug 352 which underlies the arm 348. Thus, when the bell crank 338 is pivoted to the position shown in FIGURE 8 by upward swinging movement of the lift arm 122, the rod 346 pivots the arm 348 downward and the lug 352 is contacted by the arm 348 to maintain the trigger 330 in retracted position. Subsequently, the lift cam 121 pushes the lift arm 122 downward, whereby the bell crank 338 is released and the trigger 330 is free to reset and engage the lift arm 122 to hold it down. The trigger 330 is reset by a tension spring 354 (FIG. 4) which is arranged to pivot the trigger 330 (FIG. 8) counterclockwise. The lug 352 thus lifts the free end of the arm 348 and the rod 346 is elevated.

In its first described lowered position, the rod 346 maintains the carton stops 37 in lowered position so that the tray pushers 48 which were elevated by the lift arm 122 can eject the tray and cover. Thus, the lower end portion of the rod 346 is pivoted to a link 356 which is secured to, and projects outward from, a shaft 358. Shaft 358 is rotatable in a bearing block 360, and another bearing block not visible, and carries the left tray stop 37. The pivot shaft 351 (FIG. 8), which pivotally mounts the arm 348, is clamped in the split end of an arm 362 (FIG. 4). In a manner similar to the mounting of the left tray stop 37, the right tray stop 37 is actuated in synchronism therewith by the arm 362 via a rod 364 and a link 356, and has two support bearings 368 (FIG. 3), only one being shown, for its operating shaft 370.

*Operation*

When the carton handling machine 20 is placed in operation, it is necessary to manually initiate the operating cycles, before the trays 22 are fed into the machine, by actuating a clutch control lever 372 (FIGS. 1 and 8) in order to load a folded cover 30 into the cover applying chute 40. The lever 372 is pivoted to a fixed frame member by a bolt 374 and is connected, by means of a cable 376, to a clutch pawl operating lever 378. The lever 378 is clamped onto the outer end of the shaft 248 (FIG. 2) where it projects from the side plate 64, and is operative, when actuated remotely by the clutch control lever 372, to release the clutch pawl 246. Shaft 110 is thus rotated for one revolution, and the delivery and feed cams 116 and 118 (FIG. 4) cause the picking arm 44 (FIG. 7) to grip the lowermost cover blank 30 in the magazine 42 and feed it onto the folding shoe 46, cause the folding arm 47 to fold the cover, and cause the ram mechanism 120 to deliver the folded cover into the cover applying chute 40. Since no tray 22 is yet positioned to receive the cover, the tray sensing switch LS2 (FIG. 4) is open and the solenoid 322 is not energized. Switches LS1 (FIG. 6), LS3 (FIG. 4) and LS4 (FIG. 7) will now be closed, however, and all that remains to be done for an operating cycle to begin is that a filled tray 22 be supplied to the continuously moving input belt 36 so as to close the switch LS2.

Until the trays 22 arrive, the tray pushers 48 are circulated through the machine by the continuously moving conveyor chain 260, but are not raised by the lift arm 122 due to the open condition of switch LS2. The cam follower rollers 280 (FIG. 2) of the pushers thus follow the lower run of the cam track provided by the track members 320 and 288, and the pushers thereby bypass the tray covering zone B.

Returning now to FIGURES 1 and 2, when the first incoming tray closes switch LS2, the solenoid 322 is energized and the trigger 330 is released from engagement with the lift arm 122. The lift arm contacts the roller 280 of a superposed pair of the tray pushers 48 and its spring 235 raises the pushers into trailing relation to the tray and cover. When the left arm 122 (FIG. 1) moves upward, it rotates the sleeve 238 counterclockwise (FIG. 2), and the pawl actuator 242 releases the pawl 246 from the clutch 108. The lift arm is immediately lowered by the lift cam 121, however, and the pawl 246 moves back into position where it limits the shaft 110 to a single revolution. When the shaft 110 (FIGS. 1 and 4) is thus rotated, the cams 114, 116 and 118 again feed a cover blank, fold the blank, and deliver the blank into the cover aplying chute 40. It is to be especially noted that the previously applied cover and its tray are not yet clear of the cover applying zone B; there is thus an overlap in functions which permits the delivery of a folded cover into the cover applying chute 40 without first clearing the zone B, and this feature contributes importantly to the high operational speed maintained by the carton handling machine 20.

The above mentioned overlap in functions is most readily understood by reference to FIGURES 7–12. In FIGURE 7 the tray 22 and its cover 30 have just started to be moved downstream by the pushers 48 engaged with the trailing end wall of the tray, and in FIGURE 8 the picker arm 44 has gripped the lowermost cover blank 30 and pulled it downward toward the folding shoe 46. At the same time, the previously delivered folded cover 30 (FIG. 7) is being applied to the tray 22 (FIG. 8) by the cover applying chute 40.

In FIGURE 9, the lift arm 122 is being lowered by the lift cam 121 so that the shelf 318 of the arm will be positioned under the cam follower roller 280 of the next approaching pusher 48. The covered tray has been pushed partially into the heating zone C, and the folding arm 47 is lowering over the unfolded cover blank 30 of the folding shoe 46. The applied cover 30 moves beneath a fixed rod 380 that is mounted at one end to the folding shoe 46 and extends to the discharge end of the machine to maintain the covers in place on their respective trays before and after the covers are bonded to the trays. The outer surfaces of the side flaps 34 and 35 of the applied cover slide along the inner, lower surfaces 382 (FIG. 3A) of inner side plates 384 and under guide rods 385 which extend to the inlet end of the pressure applying zone D. The inner side plates 384 are secured to outer side plates 386 and are offset outward from the frame plates 64 and 66. In each of the thus formed recesses between the cover side flaps 34 and 35 and the tray side walls 25 and 26 of a tray and a cover at heating zone C, are mounted two tubular, quartz infra-red heating lamps 388. The infra-red heat rays from the bulbs 388 quickly render the band 28 (FIG. 1A) of adhesive on the tray 22 tacky. The guide rods 385, downstream of the lamps 388 and at the entrance of the pressure applying zone D, are bent inward to place the cover side flaps 34 and 35 adjacent the tray side walls 25 and 26, after which the pressure rollers 50 push the flaps firmly against the side walls. Subsequent chilling of the band 28, as the tray and cover move through the pressure applying zone, causes the side flaps to be firmly bonded to the tray.

In FIGURE 10 the folding arm 47 has folded the previously flat cover blank 30 into inverted U-shape over the folding shoe 46, and the lift arm 122 is still being moved downward by the lift cam 121 while another filled, uncovered tray 22 is being fed by the input belt 36. The tray stops 37 are still in their retracted positions because the arm and roller 336 of the lift arm 122 are still engaging the bell crank 338 and must remain so engaged until the tray and cover being conveyed from the cover applying station B clear the tray stops 37.

FIGURE 11 shows the extent of the timing overlap previously mentioned. The ram mechanism 120 has been actuated by the delivery cam 116 (FIG. 4) whereby the cover engaging head 192 has engaged and partially moved the folded cover on the folding shoe 46 into the cover applying chute 40 even before the covered tray has cleared the carton stops 37. It will also be noted by comparing FIGURES 10 and 11 that the incoming tray 22 is overtaking the pusher 48 which is ejecting the covered tray because the linear speed of the input belt 36 is faster than the linear speed of the tray pushers 48. Before the cover engaging head 192 has pushed the folded cover off the folding shoe 46, the folding arm 47 will have been raised by the control cam 114, as is shown in FIGURE 12.

The lift arm 122 (FIG. 12) has been pushed to its lower-most position by the lift arm cam 121, whereby the switch LS4 is engaged by the lift arm and has been actuated to a closed position. The tray sensing switch LS2 (FIG. 4) is in a position closed by the tray 22 at the tray covering station B, and the cover sensing switch LS1 (FIG. 6) is in a position closed by the folded cover 30 being placed in the chute 40. However, the solenoid 322 is not energized because the timing switch LS3 (FIG. 4) is open, and will not be closed until after the feed cam 118 has effected full seating of the folded cover in the chute 40. The lift ram 122 thus remains latched by the trigger 330 until such time as the solenoid 322 becomes energized. When the solenoid is energized, a roller 280 of the next arriving pusher 48 will lie above the lift arm shelf 318, and the trigger 330 is pivoted clockwise to release the lift arm 122. Immediately upon rising movement of the lift arm 122, its roller 336 strikes the bell crank 338 and rotates the bell crank. This causes the associated rod 346 to be forced downward and the tray stops 37 are thus lowered so that the tray can be ejected. It will be seen by comparing FIGURE 12 with the next operations shown in FIGURES 7 and 8 that the tray 22 is actually moved forward by the input belt 36 before the pusher 48 is in place to push the tray, and that the cover 30 is placed upon the tray while the tray is moving.

It will be seen that if the lift arm 122 is not raised, the pawl actuator 242 (FIG. 2) is not actuated to release the pawl 246 from the clutch 108. Accordingly, the shaft 110 remains at rest, and neither the ram mechanism 120 nor the picking arm 44 will move.

From the preceding description it is evident that the carton handling machine 20, and the unique cover and tray assembly method carried out by the machine, are adapted for the rapid, continuous production of filled cartons. Because the various operations are controlled by the trays and covers, the output of covered trays is always at maximum rate when the supply of covers and trays exceeds the throughput of the machine. At the same time, the carton handling machine 20 is independent of any connections to the associated structures which supply the filled trays to the machine and which deliver the covered trays from the machine.

Having thus described the invention, that which is believed to be new and for which protection by Letters Patent is desired is:

1. In a carton handling machine for assembling a tray and a separate cover, continuously driven endless conveying means having a pusher flight arranged to selectively travel over one of two alternate paths with one of said paths placing said pusher flight in engagement with a tray to convey the tray away from a cover-applying zone, individual means for delivering a cover and a tray to said zone with the cover overlying the tray, means for sensing the presence of said tray and said cover at said cover-applying zone, and means responsive to said sensing means to direct said pusher flight to said one of said two paths and into engagement with said tray.

2. A carton handling machine comprising a continuously driven endless conveyor chain having a conveying run movable through a cover-applying zone toward a discharge zone, a plurality of pusher flights carried by said conveyor chain, each of said pusher flights being provided with a pivotal connection to said chain whereby the pusher flight is movable between an operative position elevated above the plane of said conveying run and an inoperative position below said plane, a cam follower roller mounted on each of said pusher flights, a fixed cam track engaged by said follower rollers, said cam track including an upper propelling run and a lower bypass run which are subjacent said cover applying zone, individual means for delivering a container tray and a container cover into juxtaposition for assembly at said cover-applying zone, means for sensing a tray and cover thus positioned, and lift means governed by said sensing means and arranged to lift one of said pusher flights from said bypass run to said propelling run of said cam track and into propelling relation with said tray.

3. Apparatus according to claim 2 wherein said bypass cam track run includes an upwardly open aperture through which said cam follower rollers are movable, and wherein said lift means includes an upwardly movable support shelf arranged to elevate a superposed cam follower roller through said aperture and into alignment with said propelling track run.

4. In a carton assembling machine for applying covers to container trays, an elongate frame, an endless conveyor mounted in said frame, said conveying flight extending downstream from a cover applying zone at which individual superposed covers are applied to the trays, a pusher carried by said chain, said pusher being selectively movable between operative and inoperative positions respectively above and below the conveying flight of said chain, a cam follower roller mounted on said pusher, a stationary cam track mounted on said frame and engaged by said roller, said cam track having a run subjacent said cover applying zone whereby said roller when engaged with said run maintains the pusher in inoperative position, means defining an upward egress for the roller in said cam track adjacent said cover applying zone, a lift arm movable through said egress in supporting relation with said roller, means for positioning a tray and cover at said cover applying zone, sensing means for determining the presence of a tray and cover at said zone, and activating means controlled by said sensing means for raising said lift arm when a tray and cover are positioned at said cover applying zone.

5. In a carton assembling machine, an endless conveyor trained around spaced apart conveyor drive and idler wheels and having an upper conveying flight extending between said wheels, a tray pusher carried by said conveyor and arranged to convey a tray along said conveying flight, said tray pusher being selectively movable between an operative position projecting above said conveying flight and an inoperative position beneath the plane of said flight, and pusher retracting means adjacent the downstream one of said wheels for moving said tray pusher into inoperative position before the tray pusher decelerates over the adjacent one of said wheels and thereby reduces the conveying speed of the tray.

6. In a carton assembling machine, an endless conveyor trained around spaced apart conveyor drive and idler wheels and having an upper conveying flight extending between said wheels, at least two tray pushers carried by said conveyor and arranged to receive and convey a tray therebetween along said conveying flight, each of said tray pushers being selectively movable between an operative position projecting above said conveying flight and an inoperative position beneath the plane of said flight, and pusher retracting means adjacent the downstream one of said wheels for moving the leading one of said tray pushers into inoperative position before the tray pusher decelerates over the adjacent one of said wheels and thereby reduces the interspacing of said tray pushers.

7. Apparatus according to claim 5 and further including a second tray pusher, the interspacing of said pushers corresponding to the length of a tray, said pushers each being provided with a laterally projecting roller and a forwardly projecting arm pivoted to said endless conveyor, said pusher retracting means including a transfer wheel driven in timed relation to said conveyor, two diametrically opposed transfer arms pivotally connected to said transfer wheel in a vertical plane including said rollers, the free end of each transfer arm being bifurcated and arranged to engage alternate approaching pusher rollers, a cam follower roller pivoted to each transfer arm, and camming means engageable by said cam follower rollers for lowering the trailing end of the associated pushers before the pivoted end portion of the pusher reaches top dead center of the adjacent one of said conveyor wheels, said arms supporting the trailing end portion of said pushers while the pivoted end portions of the pushers are carried around said wheel, said pushers thereby being successively lowered beneath said conveying flight before decelerating.

8. In a carton assembling machine, an endless conveyor chain trained around spaced apart conveyor drive and idler sprockets and having an upper conveying flight extending between said sprockets, at least two spaced apart tray pushers pivotally connected to said conveyor chain and arranged to receive and convey a tray therebetween along said conveying flight, each of said tray pushers being retractable from an operative position projecting above said conveying flight to an inoperative position beneath the plane of said flight, and means adjacent the downstream one of said sprockets for successively retracting said tray pushers into inoperative position before the pushers travel over and are decelerated by the sprocket adjacent the downstream end of said conveying flight.

9. Apparatus according to claim 6 wherein said pushers are each provided with a laterally projecting roller and a forwardly projecting arm pivoted to said endless conveyor, said pusher retracting means including a transfer wheel driven in timed relation to said conveyor, dual transfer arms pivotally connected to said transfer wheel in a vertical plane including said roller, the free end of each transfer arm being bifurcated and arranged to engage alternate approaching pusher rollers, a cam follower roller pivoted to each of said transfer arms, and camming means engageable by each cam follower roller for lowering the trailing end of said pusher before the pivoted leading end portion of said pusher reaches top dead center of the adjacent one of said conveyor wheels, said transfer arms supporting said trailing end portion of the pushers while the pivoted end portion of the pusher is carried around said wheel until the pusher reverses direction.

10. A machine for assembling a tray and a separate cover comprising continuously driven conveying means having a pusher selectively engageable with a tray to convey the tray through a cover applying zone, individual means for delivering a tray and a superposed cover to said cover applying zone, switch means for separately sensing the presence of said tray and said cover at said cover applying zone, means responsive to the actuation of said switch means for diverting said pusher from its normal path of travel and positioning it in engagement with said tray, and means for delivering a second cover to said cover applying zone when the first cover and its associated tray are being transported from said zone by said conveying means.

11. A carton assembling machine for applying covers to container trays comprising a tray conveyor having a conveying flight arranged to convey an open-top generally rectangularly shaped tray downstream from a cover applying zone, cover applying means mounted over said cover applying zone for applying a folded cover to said tray while said tray is moving in said downstream direction, cover folding means mounted adjacent said zone for folding an initially flat cover blank into inverted U-shape by making two parallel folds in said blank to form a flat top panel and two downwardly projecting side flaps, a cover blank magazine arranged to hold a vertical stack of unfolded covers over said cover folding means, cover delivery means for delivering the lowermost unfolded cover from said magazine to said cover folding means, cover feeding means arranged to feed the folded cover from said cover folding means to said cover applying means, control means effective to actuate said cover delivery means to deliver an unfolded cover blank to said folding means while a previously folded cover is applied to a tray by said cover applying means by placing said top panel over the open top of said tray so that said side flaps extend on either side of said tray in said downstream direction of movement of said tray, and means for adhesively securing the lower edges of said side flaps to the sides of said tray downstream from said cover applying zone as said tray is moved therealong.

12. A method of closing a generally rectangularly shaped open-top tray comprising the steps of removing a flat rectangularly shaped blank from a stack, folding said blank to form said closing cover by making two parallel folds therein to form a flat top panel and two downwardly projecting side flaps, moving said cover in a direction parallel to said folds to place it upon said tray with said top panel overlying and substantially matching the size and shape of the open top of the tray and with the side flaps being placed adjacent to the longitudinal sides of said tray, conveying said tray in a longitudinal direction parallel to said sides of the tray, and adhesively securing the side flaps to the longitudinal sides of said tray while said tray and cover are moving together in said longitudinal direction.

13. A method of closing a generally rectangularly shaped open-top tray set forth in claim 12 wherein said tray is continuously moved in said longitudinal direction while said cover is placed thereon.

14. A method of closing a generally rectangularly shaped open-top tray as set forth in claim 12 wherein at least one of the tray or cover members are provided with a heat-activated adhesive for bonding the opposing surfaces of said cover side flaps and said sides of the tray, said step of adhesively securing the side flaps to the sides of the tray comprising passing said tray and overlying cover past heating means interposed between each of said side flaps and its associated tray side to effectively activate said adhesive, and inwardly applying pressure to said side flaps downstream of said heating means to interengage said opposing surfaces until the adhesive sets to provide a permanent bond between said cover and said tray.

15. A carton handling machine for applying a closing cover to a generally rectangularly shaped open-top tray comprising means for holding a stack of flat rectangularly shaped blanks, means for removing the bottom blank of said stack, means for folding said blank to form said closing cover by making two parallel downward folds therein to form a flat top panel and two downwardly projecting side flaps, means for continuously conveying said open-top tray in a longitudinal direction parallel to its longitudinal sides, means for feeding said cover in a direction parallel to said folds to a position overlying said tray, means for applying said cover to said tray while said tray is moved in said longitudinal direction by placing said top panel over the open top of said tray, said top panel being substantially the same size and shape as said open top of the tray, and means downstream of the cover applying zone for adhesively securing the side flaps of the cover to said longitudinal sides of the tray.

16. A carton handling machine as set forth in claim 15 wherein a heat-activated adhesive is provided upon one of said cover side flaps or longitudinal tray sides and wherein said means for adhesively securing the cover to the tray comprises a pair of heating means interposed between said side flaps and said longitudinal sides of the tray to effectively activate said adhesive, a pressure means positioned downstream of said heating means for forcing said side flaps into pressure engagement with said longitudinal sides of the tray to provide a permanent bond therebetween.

References Cited

UNITED STATES PATENTS

| | | | |
|---|---|---|---|
| 2,575,544 | 11/1951 | Zinn | 53—39 |
| 2,623,338 | 12/1952 | Riemer | 53—42 |
| 2,649,392 | 8/1953 | Marshal | 53—39 |
| 2,799,981 | 7/1957 | Baker-Carr | 53—39 |
| 2,875,563 | 3/1959 | Moore | 53—39 |
| 3,138,905 | 6/1964 | Ellinger | 53—47 |
| 3,166,462 | 1/1965 | Shoder | 53—39 |
| 3,191,359 | 6/1965 | Stark | 53—39 |

RICHARD H. EANES, Jr., *Primary Examiner.*